United States Patent [19]
Wawrzynski

[11] Patent Number: 5,676,990
[45] Date of Patent: Oct. 14, 1997

[54] METHOD OF FOOD ARTICLE DIPPING AND WIPING IN A CONDIMENT CONTAINER

[76] Inventor: David W. Wawrzynski, 25601 Cole, Roseville, Mich. 48066

[21] Appl. No.: 639,953

[22] Filed: Apr. 29, 1996

[51] Int. Cl.[6] .......................... B65D 25/00; B65D 85/72; A23L 1/00
[52] U.S. Cl. .......................... 426/305; 426/115; 426/302; 426/394; 220/695; 220/700; 15/220.4; 118/13; 118/100
[58] Field of Search .......................... 426/112, 115, 426/122, 123, 305, 302, 394; 220/695–702; 215/247; 15/220.4; 118/13, 18, 100

[56] References Cited

U.S. PATENT DOCUMENTS

| | | |
|---|---|---|
| 1,810,837 | 6/1931 | MacElone . |
| 2,122,299 | 6/1938 | Sloan . |
| 2,157,432 | 5/1939 | Pitar .......................... 220/695 |
| 2,257,823 | 10/1941 | Stokes . |
| 2,436,291 | 2/1948 | Daniel .......................... 220/700 |
| 2,627,619 | 2/1953 | Gagen .......................... 220/700 |
| 2,785,692 | 3/1957 | Gordon .......................... 220/700 |
| 2,813,799 | 11/1957 | Bender et al. . |
| 2,918,373 | 12/1959 | Weston .......................... 426/80 |
| 2,925,188 | 2/1960 | Grumbles .......................... 220/695 |
| 3,022,916 | 2/1962 | Spooner .......................... 220/695 |
| 3,080,238 | 3/1963 | Kraft et al. .......................... 426/123 |
| 3,301,687 | 1/1967 | Davy .......................... 426/123 |
| 3,349,972 | 10/1967 | Whiteford . |
| 3,380,646 | 4/1968 | Doyen et al. . |
| 3,424,351 | 1/1969 | Cilluffo et al. .......................... 220/695 |
| 3,442,413 | 5/1969 | Bernstein .......................... 220/695 |
| 3,799,914 | 3/1974 | Schmidt et al. . |
| 3,823,840 | 7/1974 | Zackheim .......................... 215/247 |
| 3,861,284 | 1/1975 | Costello .......................... 426/80 |
| 3,930,041 | 12/1975 | Komatsu et al. . |
| 3,938,686 | 2/1976 | Milligan .......................... 220/700 |
| 3,955,006 | 5/1976 | Sokolsky et al. . |
| 4,409,252 | 10/1983 | Buschkens . |
| 4,854,466 | 8/1989 | Lane .......................... 426/115 |
| 4,923,701 | 5/1990 | VanErden . |
| 5,277,920 | 1/1994 | Weaver .......................... 426/115 |

FOREIGN PATENT DOCUMENTS

| | | | |
|---|---|---|---|
| 975037 | 10/1950 | France .......................... | 220/700 |
| 2025888 | 1/1980 | United Kingdom .......................... | 220/700 |
| 2205082 | 11/1988 | United Kingdom .......................... | 220/700 |

*Primary Examiner*—Steven Weinstein
*Attorney, Agent, or Firm*—Peter D. Keefe

[57] ABSTRACT

A food wiping condiment container for removing excess condiment from a food article after being dipped thereinto. The condiment container has a body, a thin, flexible cap sealingly attached to the body, and a tear-away strip attached to the cap. When the tear-away strip is torn from the cap, a slit is formed in the cap with mutually opposed slit edges. When a food article is partially inserted into the condiment container through the slit, the slit edges of the cap wipe against the food article. Accordingly, after the food article is partially dipped into a condiment stored inside the condiment container, the slit edges of the cap wipe against the food article to limit the thickness of condiment adhering to the food article as it is moved therepast.

2 Claims, 1 Drawing Sheet

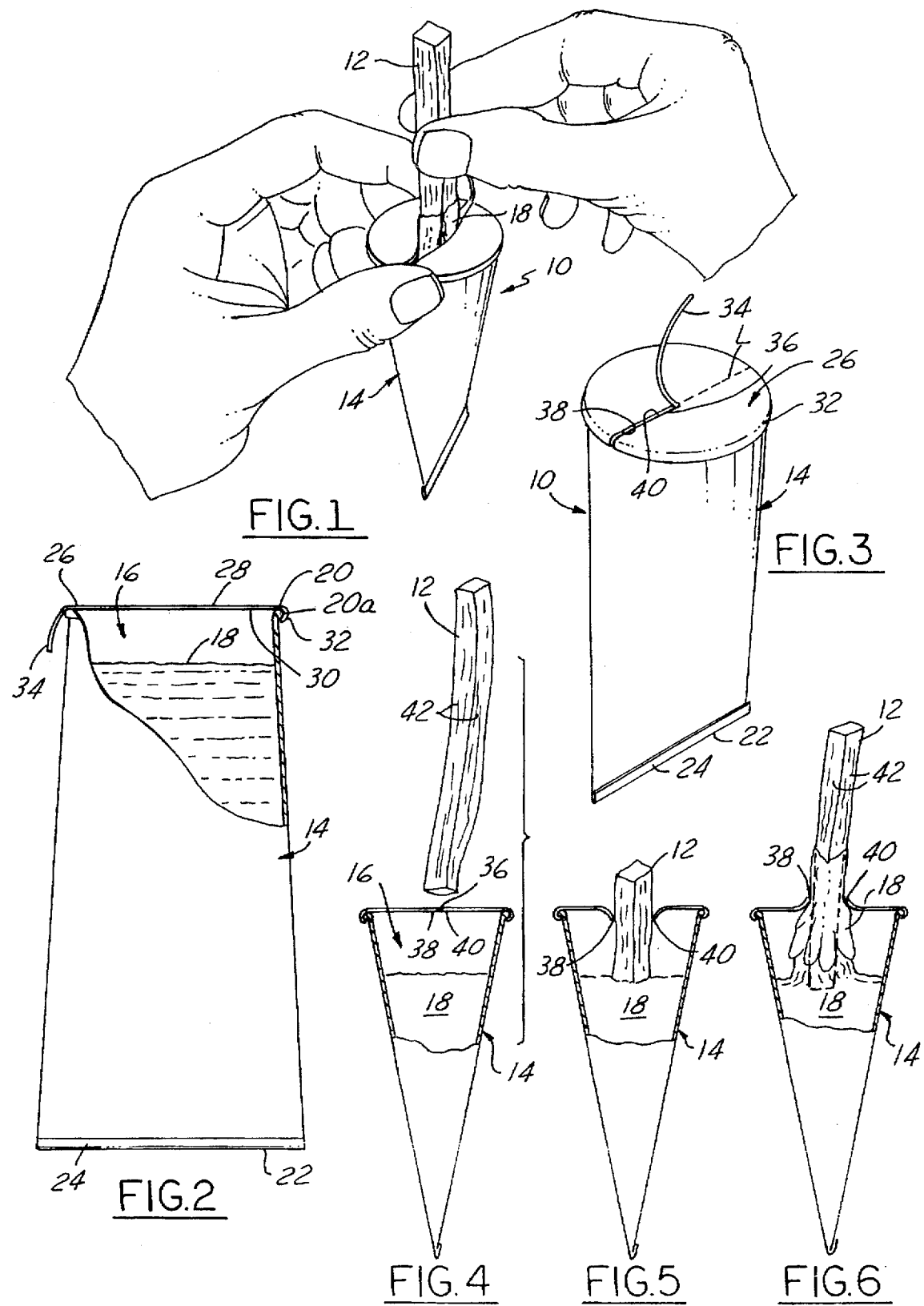

METHOD OF FOOD ARTICLE DIPPING AND WIPING IN A CONDIMENT CONTAINER

BACKGROUND OF THE INVENTION

1. Field of the Invention

The present invention relates to packaging, and particularly to storage containers for storing food condiments. More particularly, the present invention relates to such a storage container having a selectively openable cap structured to wipingly engage the surface of food articles which are inserted therethrough, thereby restricting the amount of material dispensed therefrom when the food article is withdrawn.

2. Description of the Background Art

Several types of disposable condiment storage containers are known and are in use today. Many of the known types of disposable storage containers are pillow shaped, are made of flexible material such as paper or plastic, and are opened by tearing off a generally flattened end portion. Other types of condiment storage containers have a generally cup-shaped plastic base with a flexible paper or foil lid sealably attached to the base, and are opened by peeling the flexible lid off the base.

What follows is a listing of some previously issued patents relating generally to packaging.

U.S. Pat. No. 2,122,299 to Sloan discloses a resilient dispensing top for a glass bottle or similar container. The top includes a flexible cover member formed of rubber or other resilient material, and having a central slit formed therein. The flexible cover member is held on the top of the bottle by a cap which fits over the cover member. A boss which is attached to an edge of the flexible cover member extends through an opening in the cap, and may be pressed inwardly to open the cover member, along the slit, to dispense contents of the container.

U.S. Pat. No. 2,257,823 to Stokes discloses a method and apparatus for producing containers. The containers are fed continuously from a web, and are formed in a double-walled, substantially tubular shape.

U.S. Pat. No. 3,349,972 to Whiteford discloses a dispenser closure for toothpaste or the like, which includes a body having a cup-shaped member at its upper end, and a marquise-shaped aperture is formed in a top wall of the cup-shaped member. The cup-shaped member has a rotatable elliptical collar permanently attached thereto, and when the collar is rotated, the collar causes the marquise-shaped aperture to open or close depending on the direction and extent of the rotation.

U.S. Pat. No. 2,813,799 to Bender et al discloses a method and apparatus for manufacturing individual condiment dispensers. The dispensers are small envelope-like enclosures, each with a dispensing neck protruding from one side of the envelope, and a tearing flap on one side of the neck to facilitate tearing the neck open to form a dispensing spout.

Although various types of containers are available today, a need still exists in the art for a food article dipping condiment storage container which restricts the amount of condiment adhering to a food item as it is withdrawn from from the container after having been dipped thereinto in order that condiment waste and mess is minimized.

SUMMARY OF THE INVENTION

The present invention provides a food article dipping and wiping container for storing and dispensing a condiment, the container including a cap which is constructed and arranged to provide a wiping action on a food article, thereby limiting the amount of condiment adhering to the food article as it is withdrawn from from the container after having been dipped thereto.

The condiment container according to the present invention, generally, includes a hollow body and a substantially flat cap which is sealably attached to an upper edge of the hollow body around the perimeter thereof. A tear-away strip is attached to the cap, wherein the tear-away strip is formed from a thin strip of substantially strong, flexible material. The tear-away strip is structured with respect to the cap for a user to pullingly tear the tear-away strip through the cap so as to thereby form a narrow slit in and across the cap which thereby opens the container and provides access to the contents thereof.

In operation, the tear-away strip is torn through the cap of a condiment container to thereby form a slit in the cap, the slit having mutually opposed slit edges on opposite sides thereof. A portion of a food article is inserted through the slit in the cap and into a quantity of condiment stored inside the container, wherein the opposed slit edges of the cap wipingly engage the food article. As the food article is removed from the condiment container, the opposed slit edges of the cap wipingly remove excess condiment adhering to the food article as the food article is pulled therepast, thereby avoiding mess as the food article is handled and eaten.

Accordingly, it is an object of the present invention to provide a food wiping condiment container which automatically wipes excess condiment from a surface of a food article which has been partially dipped therein as the article is withdrawn therefrom.

It is a further object of the present invention to provide a food wiping condiment container having a cap with a tear-away strip which creates a slit when torn off of the cap, the cap having mutually opposed slit edges on opposite sides of the slit which wipingly restrict the thickness of the layer of condiment adhering to a food article as the food article is withdrawn from the condiment container after the food article has been partially dipped into the condiment contained therein.

It is yet a further object of the present invention to provide a method for dipping a food article into a condiment, wherein the thickness of the condiment adhering to the food article is limited upon the food article being withdrawn from the condiment.

These, and additional objects, advantages, features and benefits of the present invention will become apparent from the following specification, which should be read in conjunction with the accompanying drawings.

BRIEF DESCRIPTION OF THE DRAWINGS

FIG. 1 is a perspective view of a food wiping condiment container according to the present invention, shown being hand held with a food article being withdrawn therefrom after having been partially dipped into the condiment contained there.

FIG. 2 is a cut-away side view of the condiment container according to the present invention, showing the contents thereof.

FIG. 3 is a perspective view of the condiment container according to the present invention, showing a tear-away strip being partially torn away therefrom.

FIG. 4 is a partly cut-away end view of of the condiment container according to the present invention, where a food article is shown about to be dipped thereinto.

FIG. 5 is a partly cut-away end view of of the condiment container according to the present invention, wherein the food article is shown partially dipped thereto.

FIG. 6 is a partly cut-away end view of of the condiment container according to the present invention, wherein the food article is shown being withdrawn therefrom.

DETAILED DESCRIPTION OF THE PREFERRED EMBODIMENT

Referring now to the drawings, FIG. 1 generally depicts a food wiping condiment container 10 according to the present invention, shown in operation with respect to a food article 12. In this regard, as the food article 12 is being withdrawn from the condiment container 10, after having been dipped into a reservoir of condiment located inside the condiment container, the surface of the food article is being wiped so as to reduce the thickness of the condiment 18 clinging to the withdrawn surface of the food article, while inside the container the condiment being wiped off the food article falls back into the reservoir of condiment therewithin.

The condiment container 10 has a hollow, generally tubular body 14 which surrounds and houses a storage volume 16 therein (see FIG. 2). The body 14 is preferably formed from an inexpensive flexible material such as paper or plastic, but the material used should be suitable for storing fluid suspensions or emulsions for extended time periods. Accordingly, where paper is used, it is preferably lined with either foil or plastic. A reservoir of condiment 18, such as for example ketchup, mustard, mayonnaise, tarter sauce, etc., is stored in the storage volume 16 as shown in FIG. 2. The body 14 has an upper edge 20 which lies substantially in a plane, and a lower edge 22 distally remote from the upper edge 20. In the preferred embodiment, the upper edge is provided with an annular bead 20a, and the lower edge 22 is sealed in a flattened linear seam 24. Those in the relevant art will realize that other equivalent ways of closing off the lower edge 22 of the body 14 could be used.

The condiment container 10 also includes a substantially flat cap 26 having an upper surface 28 and an opposite lower surface 30. The cap 26 is composed of a thin layer of flexible, fluid impermeable material such as coated paper, plasticized foil, plastic or combination thereof. Preferably, the cap 26 is generally flexibly deformable, yet relatively strong. The cap 26 has an outer rim 32 which defines a perimeter therearound. The cap 26 is sealably attached to the annular bead 20a of the upper edge 20 of the body 12 along the outer rim 32 thereof. The annular bead is desireably sufficiently structurally strong to resist deformation when handled, and could be composed of a suitable material attached to the upper edge of the body, such as a plastic ring.

A tear-away strip 34 is attached to the cap 26, at the lower surface 30 thereof. The tear-away strip 34 is structured with respect to the cap 26 for being pulled with respect to the cap whereupon the tear-away strip tears through the cap to thereby create a slit 36 across all, or substantially all, the cap. To facilitate the tearing action, the tear-away strip 34 is securely attached to the cap 26, preferably, though not necessarily, at the lower surface 30 thereof; also, the cap may be locally weakened by being made thinner at the tear-away strip 34, or by being pre-stressed in the local area of the tear-away strip, to thereby predispose the cap to tear in the form of a narrow strip therealong as the tear-away strip is pulled tearringly therethrough. The tear-away strip 34 is substantially linear and is made up of a thin strip or filament of substantially strong, flexible material, such as for example polyester cord, wherein the material of the tear-away strip is significantly stronger than the material of the cap 26 and which will maintain structural integrity under the stress of being pulled while the material of the cap rips. To facilitate a user grabbing the tear-away strip to being the tearing process, an ample length thereof overhangs the cap 26, as shown by FIG. 2. In order the cap 26 be torn thereacross as described herein, the tear-away strip 34 is preferably attached to the cap in an outstretched line L across the cap, preferably crossing the center thereof (see FIG. 3). The end of the tear-away strip 34 opposite the free end may or may not be attached permanently to the cap 26.

A more detailed description of the aformentioned food article wiping action will now be discussed.

As the tear-away strip 34 is pulled, mutually opposing slit edges 38, 40 of the cap 26 form in the cap as the slit 36 forms. The cap 26 locally deforms to accommodate a food article 12, such as the french fry depict in the Drawing, being thrust into the slit 36, wherein the deformation results in the edges 38, 40 pressing against the surface 42 of the food article. Thusly, the edges 38, 40 thereupon wipingly engage the surface 42 of the food article 12 and thereby restrict the thickness of condiment 18 which is allowed to pass therebetween as the food article is withdrawn from the condiment container 10 after having been dipped into the condiment. The pressing of the edges 38, 40 against the surface 42 of the food article 12 is facilitated by the cap 26 being tautly attached to the body 14 (held taut by the structural resistance to deforming by the annular bead 20a even when the slit is formed therein), and/or by the cap being composed of resilient material.

The tear-away strip and cap are mutually configured and structured to provide a slit of predetermined width that wipes food articles of known shape and size ranges (such as french fries) and predetermined condiment viscosities to thereby provide a selected range of thickness of the layer of condiment clinging to the food article after having been withdrawn from the slit.

An example of making of a food wiping condiment container 10 now be given. A substantially tubular material is fed from a roll thereof. Then a seam is formed in the substantially tubular material which is transverse to the longitudinal axis thereof, the seam defining the aforesaid lower edge 24. Next, a portion of the substantially tubular material is separated from the roll at a section which is parallel to and spaced apart from the seam to define the aforesaid upper edge 20, and thereby the body 12 of the condiment container 10. The aforementioned cap 26 is formed such as by a die cutting process and a forming process whereby the outer rim thereof is provided, and the aforementioned tear-away strip 34 is attached such as by sonic welding, adhesive or lamination process, to the lower surface of the cap. Thereupon, the cap is sealably affixed to the upper edge of the body at an outer rim of the cap. Other manufacturing processes known in the food container art may be utilized to make the condiment container according to the present invention.

Operation of the food wiping condiment container 10 according to the present invention will now be detailed.

The user grasps the body 14 of the condiment container 10, as generally depicted by FIG. 1. To open the condiment container, the user grasps the free end of the tear-away strip 34 and then pulls thereupon transversely with respect to the cap 26 to thereby cause the tear-away strip to tear through the cap. As the tear-away strip is pulled, a narrow slit 36 results across the cap, wherein the cap has mutually opposing slit edges 38, 40. The user then grasps a food article 12 and then inserts a portion thereof through the slit so as to cause the food article to dip into condiment within the condiment container and thereby coat upon the surface 42 of the food article. When the user extracts the food article from the condiment container, the slit edges of the cap wipingly engage the surface of the food article to thereby cause wiping removal of excess, mess generating condiment on the surface of the food article. Thus, the layer of condiment which does remain on the food article is not prone to dripping and messy handling of the food article after having been pulled through the slit.

Although the present invention has been described herein with respect to a specific embodiment thereof, the foregoing description is intended to be illustrative, and not restrictive. To those skilled in the art to which this invention appertains, the above described preferred embodiment may be subject to change or modification. For example, the tear-away strip may or may not be associated with a cap, but rather with a body of the condiment container, being operable to wipe food articles as generally recounted hereinabove. Further for example, the slit may be wider or narrower depending upon the deformation property of the selected material and configuration of the condiment container to thereby provide optimum wiping action of food article. Further, while a tear-away strip is the preferred agent to provide the silt, other slit forming agents known in the packaging arts may be used to form the slit. Such change or modification can be carried out without departing from the scope of the invention, which is intended to be limited only by the scope of the appended claims.

What is claimed is:

1. A method for providing a food article coated with a flowable condiment using a container containing the condiment, wherein the condiment is capable of adhering to said food article upon contact, the container including means to form a slit in the container, said method comprising the steps of:

manipulating said means to form a slit in the container to form a slit, said slit having mutually opposed slit edges on opposite sides thereof, inserting said food article into the slit and dippingly into the condiment, said slit being dimensioned and the area of the container adjacent the slit being deformable such that said opposed slit edges wipingly engage the surface of said food article, and then removing said food article from the condiment and from the container through the slit such that the opposed slit edges wipe against the surface of the food article to limit the thickness of condiment adhering to the surface of the food article by wipingly removing excess condiment which falls back into the container.

2. The method of claim 1, wherein said step of manipulating said means to form a slit is performed by pulling upon a tear-away strip connected with the container.

* * * * *